(12) United States Patent
Eschbach et al.

(10) Patent No.: US 6,192,149 B1
(45) Date of Patent: Feb. 20, 2001

(54) METHOD AND APPARATUS FOR AUTOMATIC DETECTION OF IMAGE TARGET GAMMA

(75) Inventors: Reiner Eschbach, Wesbster, NY (US); Charles M. Hains, Altadena, CA (US)

(73) Assignee: Xerox Corporation, Stamford, CT (US)

( * ) Notice: Under 35 U.S.C. 154(b), the term of this patent shall be extended for 0 days.

(21) Appl. No.: 09/056,954

(22) Filed: Apr. 8, 1998

(51) Int. Cl.$^7$ ...................................... G06K 9/00
(52) U.S. Cl. ............................ 382/168; 382/162
(58) Field of Search .................... 382/162, 168, 382/169, 170, 172; 358/519, 520, 522

(56) References Cited

U.S. PATENT DOCUMENTS

| | | | |
|---|---|---|---|
| 5,347,374 | * | 9/1994 | Fuss et al. . |
| 5,357,352 | * | 10/1994 | Eschbach . |
| 5,363,209 | * | 11/1994 | Eschbach et al. . |
| 5,371,615 | * | 12/1994 | Eschbach . |
| 5,414,538 | * | 5/1995 | Eschbach . |
| 5,450,217 | * | 9/1995 | Eschbach et al. . |
| 5,450,502 | * | 9/1995 | Eschbach et al. . |
| 5,581,370 | * | 12/1996 | Fuss et al. . |
| 5,812,286 | * | 9/1998 | Lin ........................................ 358/519 |
| 5,991,511 | * | 11/1999 | Granger ................................ 395/109 |

\* cited by examiner

*Primary Examiner*—Phuoc Tran
(74) *Attorney, Agent, or Firm*—Oliff & Berridge, PLC

(57) ABSTRACT

A method and apparatus are provided for improving the quality of a printed image by first automatically determining the gamma (γ) of an image, and then adjusting the γ of the printer, if necessary, to correspond to that of the image. Thus, if an image has a γ of 2, the γ of the printer will be adjusted from approximately 1 (its normal γ), to approximately 2 (i.e., corresponding to that of the image). To detect the γ difference problem, the invention detects a shift in saturated colors towards higher digital counts. Then, through mapping of the color space from three dimensions to two dimensions and cross-plotting values of saturation and luminance, a cumulative histogram plot of luminance is developed. The histogram displays the 256 luminance bands, arranged in one of eight bands, and normalized from zero to one. A threshold value is established for the cumulative histogram plot and the value of the cumulative histogram is compared to the threshold. If the threshold is exceeded in most of the bands, the γ for the image matches that of the printer. However, if the threshold is not exceeded, a false γ image may be indicated, for example. In this case, the γ of the printer may be automatically adjusted (e.g., increased from approximately 1 to approximately 2). Thus, the printed image will then be of the same quality as the original image.

27 Claims, 9 Drawing Sheets

(1 of 9 Drawing Sheet(s) Filed in Color)

METHOD AND APPARATUS FOR AUTOMATIC DETECTION OF IMAGE TARGET GAMMA

BACKGROUND OF THE INVENTION

1. Field of Invention

This invention relates to a method and an apparatus for improving the quality of a printed image. In particular, the invention relates to a method and apparatus for automatically determining a gamma ($\gamma$) of an image, and for adjusting the $\gamma$ of a printer to improve the quality of the printed image.

2. Description of Related Art

More and more documents are created in an electronic form. Many of these documents are created with the initial intent that they remain electronic, such as Web sites for personal, commercial, or business use. These electronic documents often contain images that are of a "frame-worthy" quality. That is, in terms of photographic content and quality, the images are good enough to use as a framed picture.

However, when these images are printed, the resulting print may be of inferior quality. The reason for this inferior quality is the difference of the reproduction behavior of a CRT monitor and a color printer, or, more generally, the difference between the intended and the actual output device. A major difference between the output devices is the device gamma (hereinafter, $\gamma$), and consequently, the image processing that was performed to optimize the image for the originally intended device $\gamma$. Displaying or printing that image on a device with a different $\gamma$ will lead to unacceptable image deterioration. For example, electronic images may be designed with a $\gamma$ of approximately two, which is commensurate for displaying the image on a cathode ray tube, for example. The cathode ray tube may be incorporated into a personal computer or a television, for example. However, if the image is then printed on a printer, the quality of the resulting image may be poor because the $\gamma$ of the printer is typically chosen to be approximately 1. As a result, the printed color image is often "washed-out" or pale.

To obtain high quality original color images, the $\gamma$ of the printer should be adjusted to correspond to that of the image (i.e., $\gamma \approx 2$). However, current systems are not capable of determining the $\gamma$ of an image when the image is viewed from an electronic document. Accordingly, an improved method and apparatus are needed to automatically determine the $\gamma$ of a color image that is incorporated into an electronic document, and to adjust the $\gamma$ setting of the printer to achieve optimum image quality.

SUMMARY OF THE INVENTION

This invention presents a method and apparatus for improving the quality of a printed image by first automatically determining the $\gamma$ of an image, and then adjusting the $\gamma$ of the printer, if necessary, to correspond to that of the image. Thus, if an image has a $\gamma$ of 2, the $\gamma$ of the printer will be adjusted from approximately 1 (its normal $\gamma$), to approximately 2 (i.e., corresponding to that of the image).

To detect the $\gamma$ difference problem, the invention may detect a shift in saturated colors towards higher digital counts. Through mapping of the color space from three dimensions to two dimensions and cross-plotting values of saturation and luminance, a cumulative histogram plot of luminance is developed. The histogram displays the 256 luminance bands, arranged in one of eight bands, and normalized from zero to one. A threshold value is established for the cumulative histogram plot and the value of the cumulative histogram is compared to the threshold. If the threshold is exceeded in a preselected number of the bands, the $\gamma$ for the image matches that of the printer. However, if the threshold is not exceeded, a false $\gamma$ image may be indicated, for example. In this case, the $\gamma$ of the printer may be automatically adjusted (e.g., increased from approximately 1 to approximately 2). Thus, the printed image will then be of the same quality as the original image.

These and other features and advantages of the invention are described in or are apparent from the following detailed description of the preferred embodiments.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The invention is described in detail with reference to the following drawings, wherein like numerals will refer to like elements, and wherein.

DETAILED DESCRIPTION OF PREFERRED EMBODIMENTS

The washed-out look of images with the wrong $\gamma$ is due to a shift of digital counts for individual colors to a higher or lower luminance level. In "normal" images, the most color-fullness is expected at luminance levels corresponding to individual saturated colors. Assuming an image will be displayed on a device capable of showing 256 gradations of color, the digital counts could range from 0 to 256. In an image designed to be displayed using a $\gamma$ larger than approximately 1 (i.e., designed to be displayed by a device with a $\gamma$ of approximately 2) a large percentage of the saturated colors should be at a higher luminance level. For example, if the correct luminance level for saturated green is one-half, in a device or system expecting the image to have a $\gamma$ of one, the luminance count would be 128.

In a system expecting a $\gamma$ of 2, the corresponding luminance count would be $128 \times \sqrt{2} \approx 180$. The same shift to higher digital counts holds for all other colors, such as red and blue, for example. On average, an image designed for display on a device having a $\gamma$ of 2 should have its "best" saturation conditions at higher digital counts and images designed for a $\gamma$ of 1.

Figure 1:
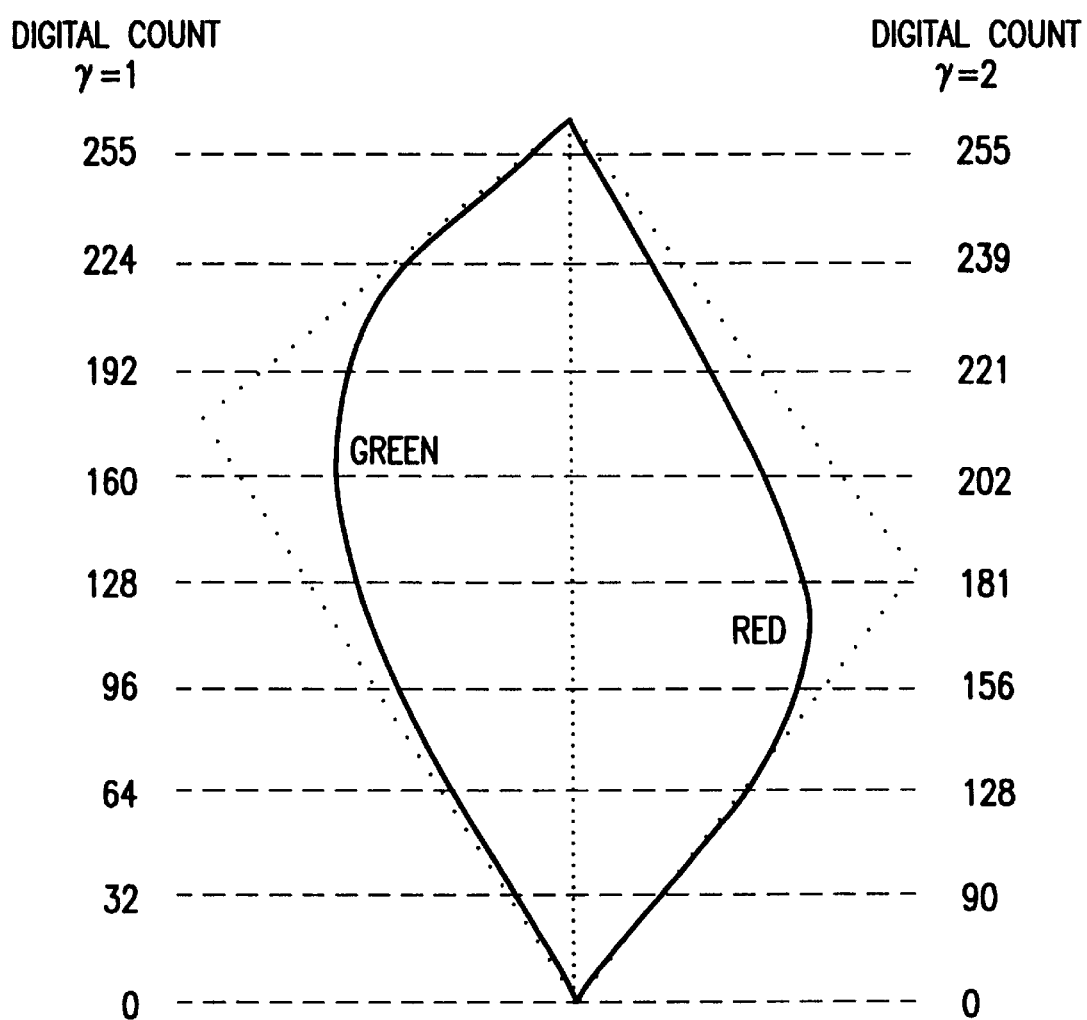
FIG. 1 shows the digital counts for $\gamma$'s of 1 and 2.

This effect is shown in FIG. 1. The dotted outline shows the color gamut for an opponent color system, with luminance along the vertical axis and the horizontal axis describing the red-greenness of the data, where points further away from the vertical axis exhibit a higher saturation than points closer to the axis. All points inside the area indicated by the dotted line can be represented by the digital values of the data. Note that the gamut of colors that can be represented in a specific digital representation is generally different from the gamut of all colors that are visible to a human observer. In a large number of cases, the gamut of the digital representation is a super-set of the gamut of the visible colors.

For example, in FIG. 1, the solid lines indicate the gamut of the actual image which is always a subset of, or equal to the gamut of the digital representation. Two points marked "green" and "red" are indicated, but the location of the points only serves as an example and is not meant to accurately determine the locus of the colors red and green. As can be seen in the figure, the saturated colors lie at the gamut points that are far away from the vertical luminance axis. In order to represent the colors in a digital representation, numbers have to be given to the luminance range. The left side of the figure shows an example digital count numbering in a linear system, where the luminance axis is divided into 256 equidistant sections. Here, "green" has a digital count value of approximately 160 and "red" of approximately 110. It is quite common in printing applications to use such a linear system to describe the digital representation.

The right side of FIG. 1 shows the digital count values if a non-linear digital representation using a γ of 2 is chosen. This type of non-linear representation is quite common in display applications where the data is to be viewed on a CRT, since the CRT characteristics are approximately equal to a γ of 2 distortion. In this representation, "green" has a digital count value of approximately 210 and "red" of approximately 170. In both cases, the digital count has shifted to higher values.

In order to detect the γ problem described above (i.e., trying to print an image designed for display on a device having a γ of 2 using a printer with a γ of 1) a shift in the saturated colors towards higher digital counts must be detected. This may require comparing digital counts considering actual luminance levels for different colors. For example, a saturated green has a higher luminance than a saturated blue. However, this type of comparison results in a complicated three-dimensional color space. To reduce processing complexity, the three-dimensional color space in this invention is first transformed into a two-dimensional color space.

The color space mapping according to an embodiment of the invention maps red, green, blue, yellow, magenta and cyan to an identical saturation level. The mapping also defines luminance so that saturated red, green, blue, yellow, magenta and cyan are at identical locations. A possible algorithm to accomplish this mapping is:

Effective saturation=max $(r,g,b)$−min $(r,g,b)$−½+|[½−mid $(r,g,b)$]|

Effective luminance=½×[max $(r,g,b)$+min $(r,g,b)$]

where, max (r,g,b) is the maximum of each of the r,g,b-triplets min (r,g,b) is the minimum of each r,g,b-triplet mid (r,g,b) is the mid-point of each r,g,b-triplet.

Effective saturation and effective luminance as defined here will be used to determine the intended γ of the image. The above given equations are only one example of effective saturation and effective luminance that can be used. The main purpose is to map the 3-dimensional color space to a 2-dimensional color space in order to reduce the computational complexity of the process. This 2-dimensional color space should have components that correlate with the colorfulness or saturation of an image as well as with the luminance or brightness of an image. However, it should be noted that the above definitions used throughout this application are exemplary in nature. These definitions are chosen for mathematical simplicity and do not necessarily coincide with visual saturation and luminance.

Figure 2:
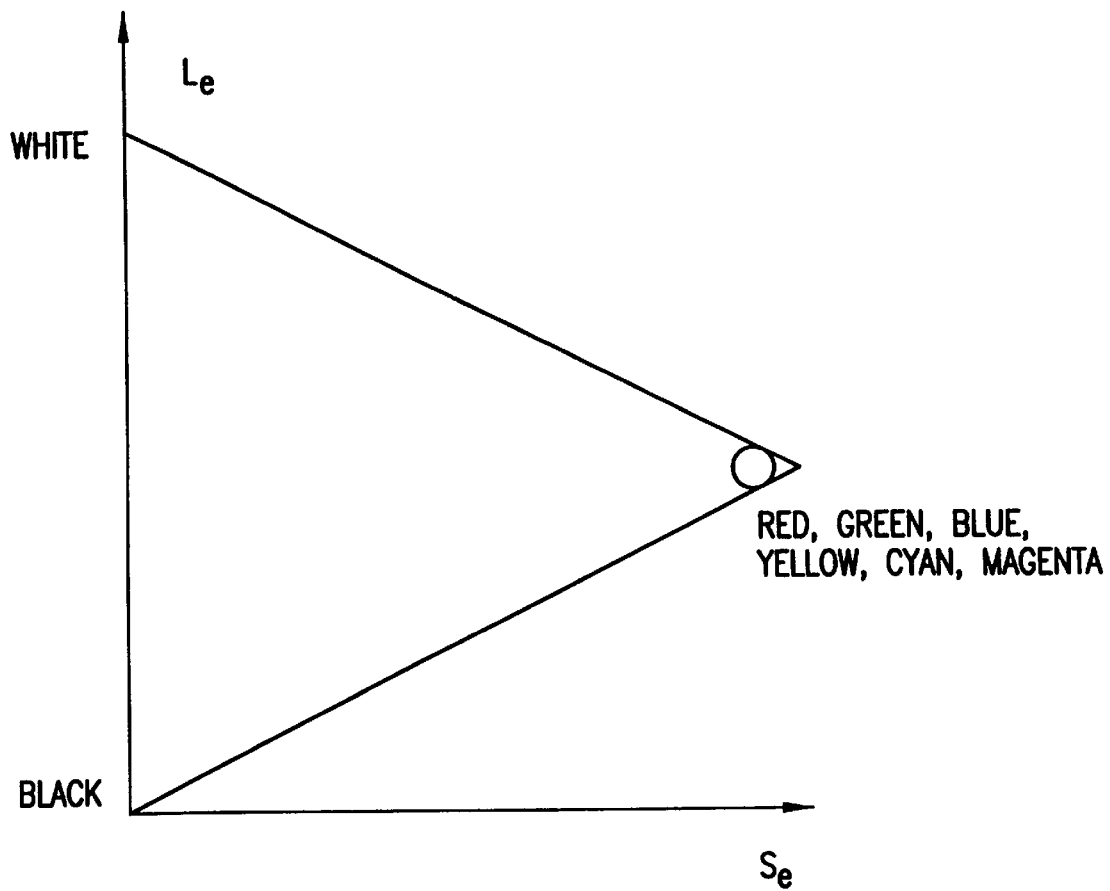
FIG. 2 shows the color space of FIG. 2.

Using the mathematical description for effective saturation and luminance, the color space of FIG. 1 is transformed into the color space of FIG. 2. The advantage of this color space is that all primary colors and secondary colors have the same gamut locus. As it is clear from FIG. 2, other color spaces, and consequently other effective luminance and saturation definitions, can be used as long as they maintain the basic properties of the gamut shown in the figure.

In the above algorithm, only red, green and blue colors are used. This is because yellow, magenta and cyan are derived from red, green and blue, and thus need not be accounted for separately. Conversely, the above algorithm could be defined in terms of yellow, magenta and cyan. Furthermore, the above algorithm is only exemplary of an algorithm that can be used to map the three-dimensional color space to a two-dimensional color space. Finally, it should be noted that the above-algorithm defines two unique terms, effective saturation and effective luminance. The effective luminance and effective saturation are essential elements in the method for automatically determining the γ of a color photographic image.

As discussed above, images designed for display on a device, such as a CRT (i.e., γ≈2), should exhibit the majority of their saturation at higher luminance levels than images designed for a printer. In the embodiment described here, this means that an image designed for a device with a γ of approximately 2 will have its effective saturation values be concentrated at high effective luminance relative to an image designed for a device with a γ of 1. Care has to be taken, however, to distinguish between at least three conditions with respect to the images: 1) images of low saturation; 2) overexposed images; and 3) false γ images. All three image types will—to a human observer—have a low visual saturation. In the first case, this is a function of the image content, e.g., a photo of a rainy day; and in the second case, the condition is caused by the washed out impression of an overexposed photo. Only the third case is assumed in this embodiment.

Figure 3:
FIG. 3 shows an image having a correct $\gamma$.

FIG. 3 shows an low saturation image, in this case an owl. Identification of an image as overexposed can be done using well-known techniques, such as Automatic Image Enhancement (AIE), which uses self-normalization for contrast determination, or separately by including AIE into the γ detection algorithm described above. Such enhancement techniques are described, for example, in U.S. Pat. No. 5,581,370 to Fuss et al., U.S. Pat. No. 5,450,502 to Eschbach et al., U.S. Pat. No. 5,450,217 to Eschbach et al., U.S. Pat. No. 5,414,538 to Eschbach, U.S. Pat. No. 5,371,615 to Eschbach, U.S. Pat. No. 5,363,209 to Eschbach et al., U.S. Pat. No. 5,357,352 to Eschbach, and U.S. Pat. No. 5,347,374 to Fuss et al, each incorporated herein by reference in its entirety.

Figure 4:
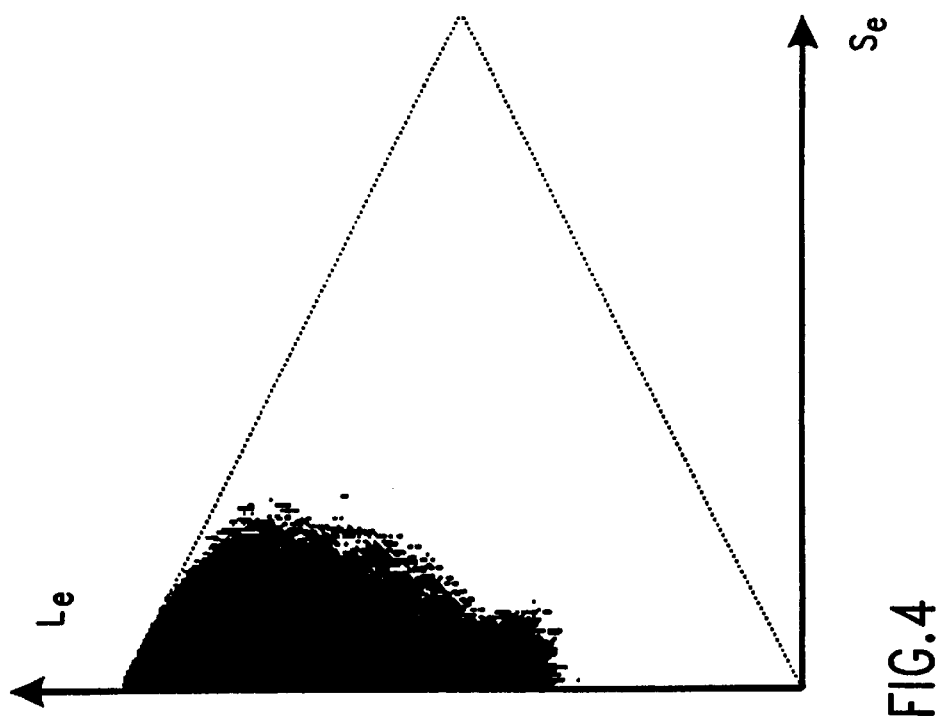
FIG. 4 shows two cross plots for two different images.
Figure 4:
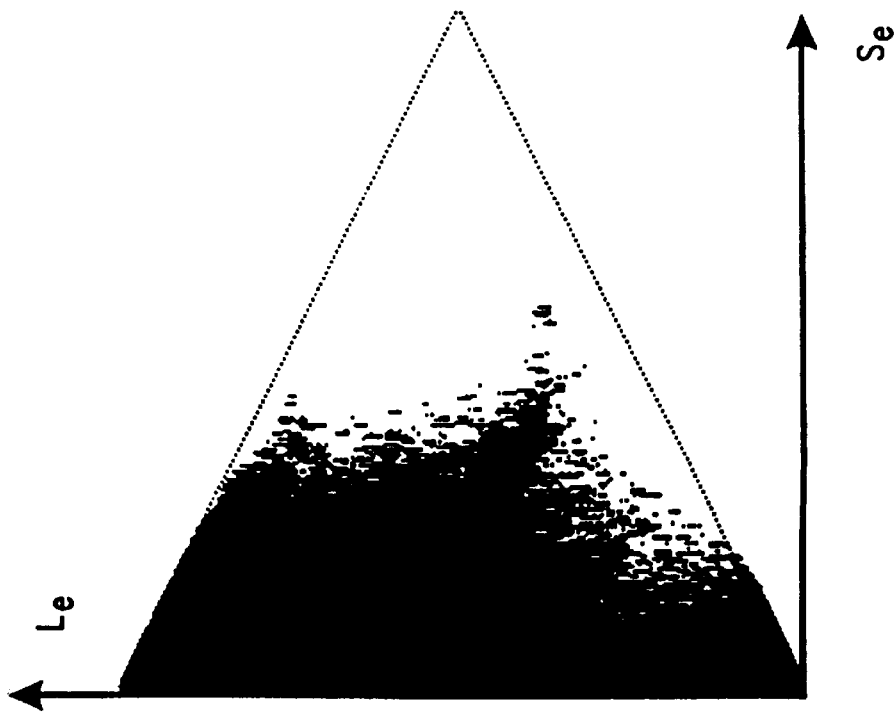
Figure 5A:
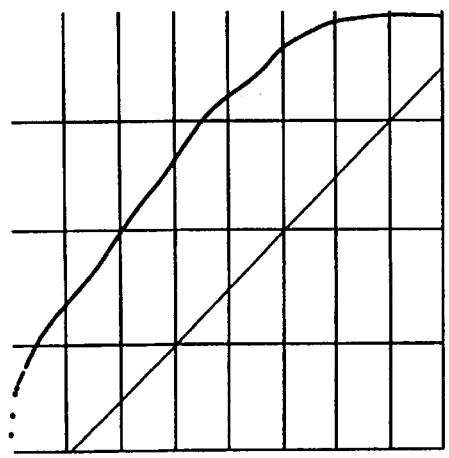
FIGS. 5A–5D show cumulative histograms for various images.
Figure 5C:
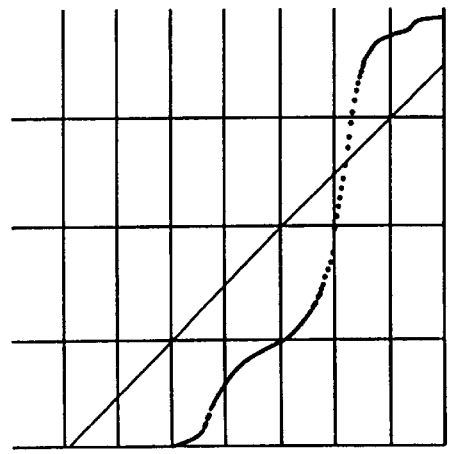
Figure 5B:
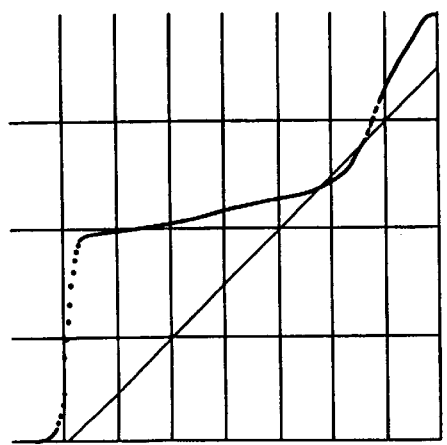
Figure 5D:
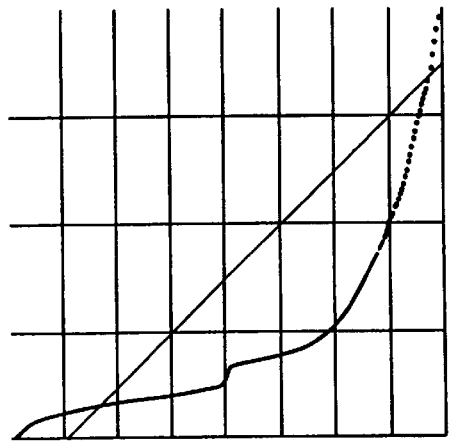

FIG. 4 shows two cross-plots of effective luminance and effective saturation for two different images. As can be seen, the image on the right has the majority of its saturated values at higher effective luminance ranges. Note that FIG. 4 only outlines the shape of the histogram, since the true histogram used in the method computes the actual count of each effective luminance—chrominance pair. FIG. 4 shows all pairs as black that exceeded a certain prespecified count, but does not show the actual count values. It is desirable to examine the histograms of FIG. 4 in a self-normalizing fashion, e.g., eliminating the influence of image size, which can be done by using a standard cumulative histogram.

Low saturation images and false γ images are distinguished by using a self-normalizing histogram characteristic. In particular, a cumulative histogram results from integrating a cross-plot of the effective luminance and effective saturation histogram. FIGS. 5A–5D show several examples of cumulative histograms achieved from luminance/ chrominance cross-plots. Note that in FIGS. 5A–5D, the effective luminance is along the horizontal axis. For clarity, the cumulative histogram was divided into eight bands and an additional line was included that follows the formula:

cumulative histogram=(effective luminance−32)/255 where it was assumed that the effective luminance has a value range of 0 to 255 and the cumulative histogram of 0 to 1. Locations where the line lies outside the value range of the cumulative histogram are omitted. The bands and the additional line will serve in the automatic γ determination, but it should be clear that both serve as a simplification and that the classification as taught in this application also is intended to include the cases where the entire luminance range, or a subset thereof is used for processing.

The value of 32 in this example is chosen to account for noise in the data. The value of 32 is approximately 12% of the range of the data from 0 to 255. However, other values, such as 25 or 27 could be chosen to account for noise in the data. Thus, this offset that accounts for noise in the range of data is chosen to optimize detection of false γ images. It is clear that by increasing the threshold value above 32, fewer images will be classified as false γ images, and by decreasing the values below 32, more images will be classified as false γ images. The threshold value thus can be set depending on the application and the requirements for false-positive/false-negative detections. The value 32 is just an example that works well in this embodiment.

The threshold condition is predicated upon the fact that a false γ image should have the major parts of its saturation at high luminance levels which expresses itself as a cumulative histogram with values below the 45° threshold line. As can be seen by referring to FIGS. 5A–5D, the cumulative histogram for various images (FIGS. 5A and 5B, respectively) are above the 45° threshold line, whereas the cumulative histograms for other images (FIGS. 5C and 5D, respectively) are mostly below the 45° threshold line. Thus, the cumulative histogram shown in FIGS. 5C and 5D correspond to false γ images. That is, the γ of the images is approximately 2.

Based on the above observations, the simple criterion can be used to determine if an image is a false γ image. Although it is feasible to compare the cumulative histogram with the threshold line for every luminance value, we chose to only compare the cumulative histogram with the threshold line in a number of preselected bands, in our case 8. Additionally, we chose to exclude high and low luminance bands due to the likelihood of noise in the data, concentrating on bands 4, 5, and 6 as indicated in FIGS. 5A–5D. It should be noted that other banding decisions can easily be made. The main attribute of the decision is that the cumulative histogram is for a specified luminance range predominantly under a predefined threshold. In the preferred embodiment, predominance was implemented by a simple rule, requiring the majority of bands to be below the threshold. Thus, if at least two of the bands 4, 5 or 6 are below the threshold line, the image was intended for a γ of approximately 2 where the bands are indicated by vertical lines starting from band 1 on the left (low luminance) to band 8 on the right (high luminance).

Figure 6:
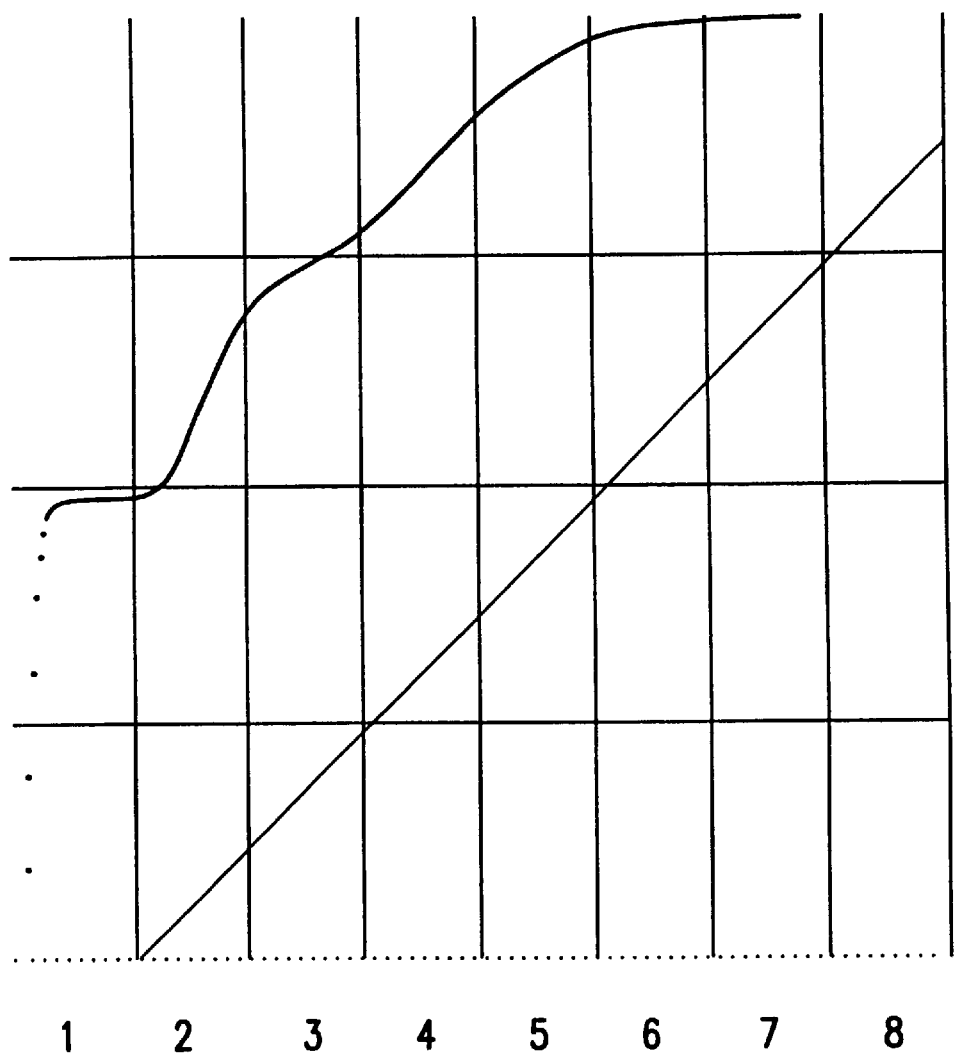
FIG. 6 is a cumulative histogram of the image of FIG. 3.

FIG. 6 shows a cumulative histogram of the image shown in FIG. 3. The high cumulative histogram values shown in FIG. 6 can be used to clearly distinguish a low saturation image such as that shown in FIG. 3 from a low saturation or false γ image. As can be seen from FIG. 6, a low saturation image also has the majority of its saturation in the digital count range of a well saturated image. Adjusting the histograms for the difference between low saturation and high saturation is one of the important aspects of the cumulative histogram.

Figure 7:
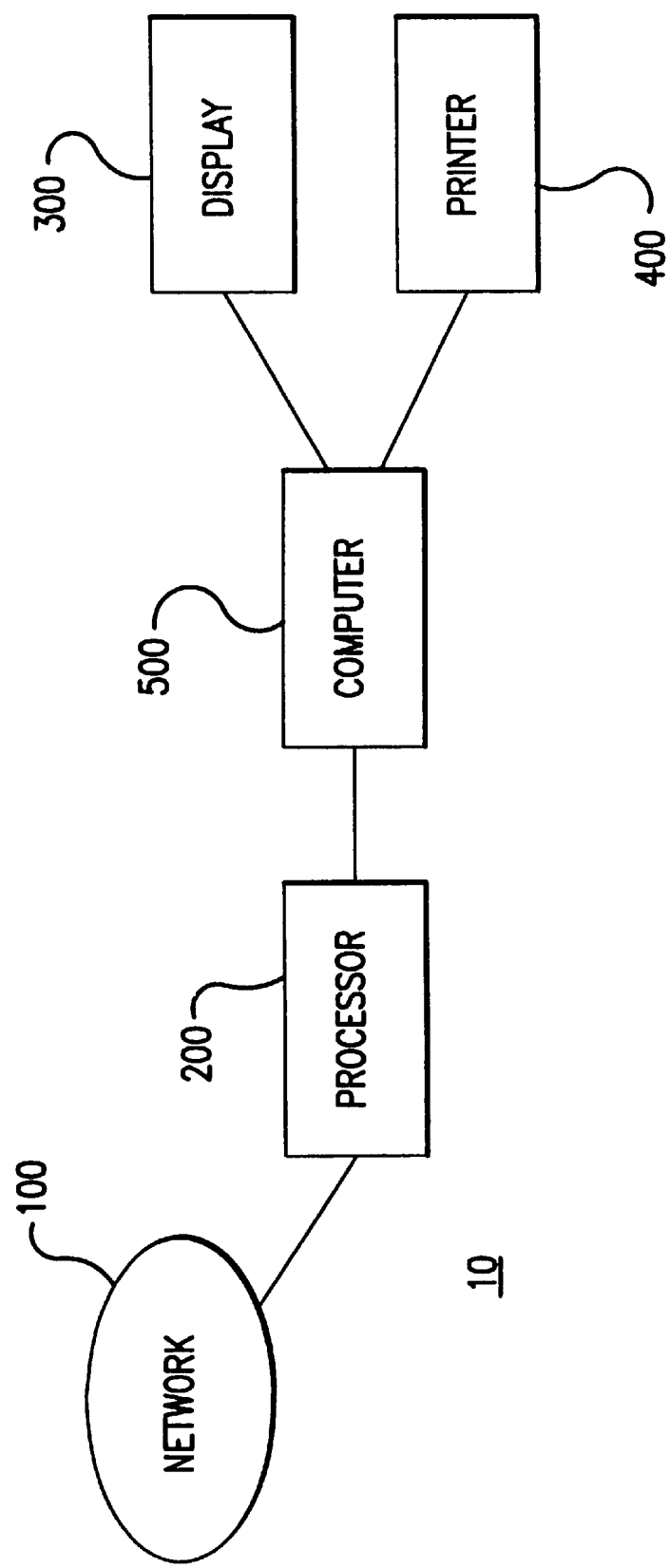
FIG. 7 shows an environment in which an automatic $\gamma$ processor operates.

FIG. 7 shows an environment 10 for automatically determining the γ of an electronic color image and for printing the image such that the quality of the printed image equals the quality of the original photographic color image even if the γ of the intended output device is not known a priori. In FIG. 7, the network 100, such as an Internet, stores electronic representations of photographic images, the electronic images can be displayed on a display 300 and printed on a printer 400. The display 300 may be attached to a personal computer 500, for example. The printer 400 may be a laser printer or ink jet printer, for example. The γ of the display device is approximately 2 while the γ of the printer is approximately 1. A processor 200, automatically determines the γ of the electronic images that are transferred from the network 100 to the display 300. The processor 200, after determining the γ of the electronic image, sends instructions to the printer 400 to adjust its γ, if the γ of the electronic image is approximately 2. If the γ of the electronic image is approximately 1, no instructions are passed to the printer 400.

In the above example, the processor 200 may be incorporated into the network as part of a server. Alternately, the processor 200 may be incorporated into the personal computer 500 which includes the display 300, for example. The printer 400 may be attached to and derive commands from the personal computer 500. The printer 400 may receive instructions from the computer 500 via software such as a printer driver loaded into a memory of the computer 500. Alternately, the printer 400 may have its own processor which receives instructions directly from the processor 200. In either event, either the printer driver in the computer 500, or the processor in the printer, receives instructions to adjust the γ of the printer to produce a high quality color photographic image of the electronic image from the network 100. In another embodiment, the computer 500 may receive electronic images over a storage medium such as a CD ROM or a floppy disk, for example. In this case, the automatic γ processor would be incorporated into the computer 500, and would send instructions to the printer 400, as appropriate.

Figure 8:
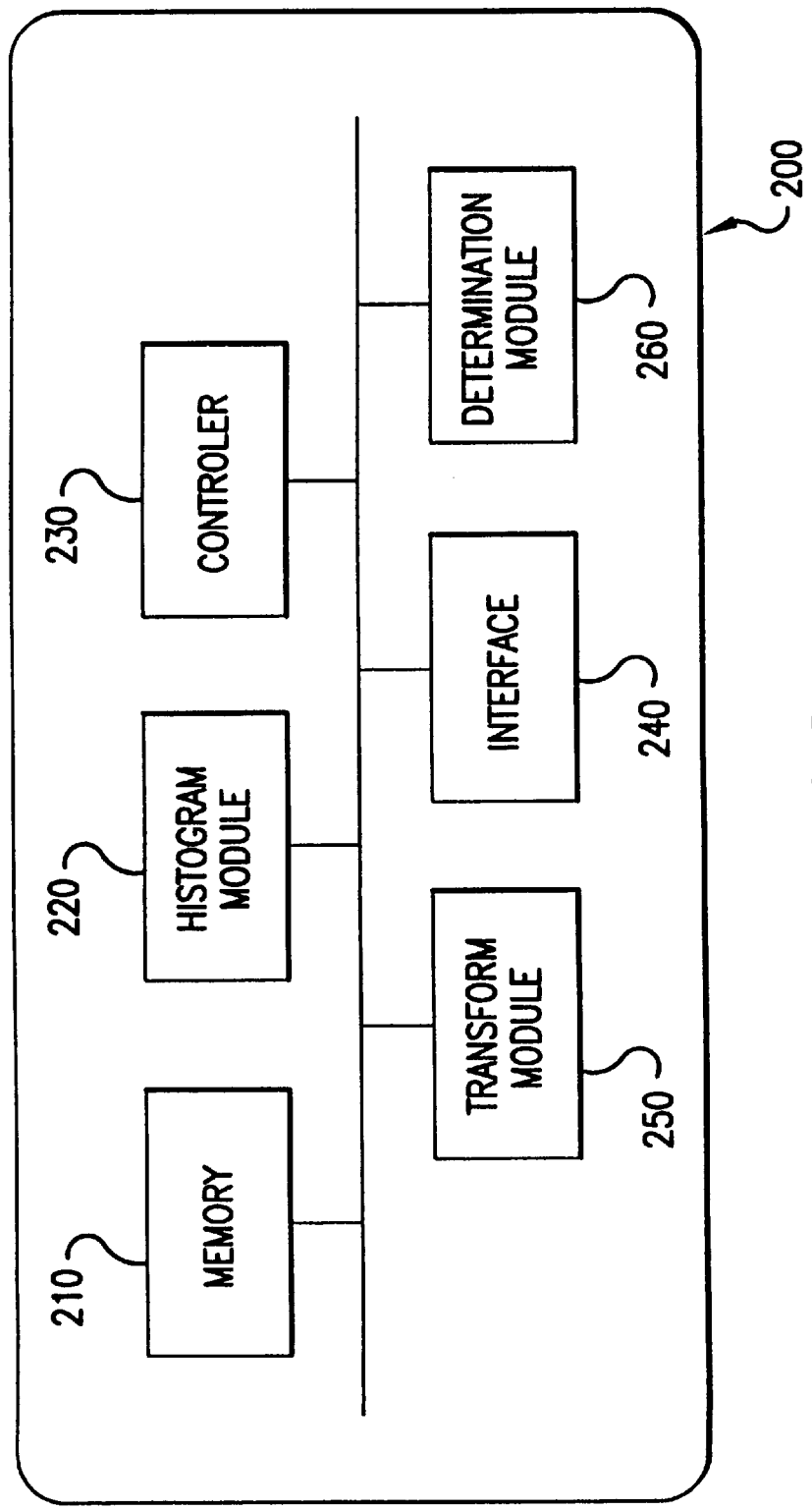
FIG. 8 is a block diagram of an automatic $\gamma$ processor.

FIG. 8 shows an automatic γ detection processor 200 in more detail. The processor 200 includes a memory 210 that stores program instructions, a histogram module 220 that constructs cumulative histograms of effective luminance; a transform module that maps the three-dimensional color space to a two-dimensional color space and produces a cross-plot of effective luminance and effective saturation, an interface 240 that receives electronic images from the network 100 and transmits instructions to the computer, and a controller 230 that controls the functioning of the above-described modules. In operation, when an electronic image is downloaded from the network 100, the interface module 240 receives the electronic document and performs initial processing. The transform module 250 then processes the data contained in the electronic image to map the three-dimensional color space into a two-dimensional color space of effective luminance and effective saturation. The transform module 250 then constructs a cross-plot of effective saturation and effective luminance. The histogram module 220 then integrates the cross-plot data to develop a cumulative histogram showing effective luminance of the electronic image. The determination module 260 then examines the cumulative histogram. If at least two of the bands 4, 5 and 6 of the cumulative histogram lie below the 45° threshold line, the determination module 260 sends a signal to the controller 230, indicating that the electronic image is a false γ image. The controller 230 then sends an instruction via the interface module 240 to the printer 400 to adjust the γ of the printer to a value of approximately 2, so that the image quality of the printed electronic image is approximately equal to that of the original color photographic image.

Figure 9:
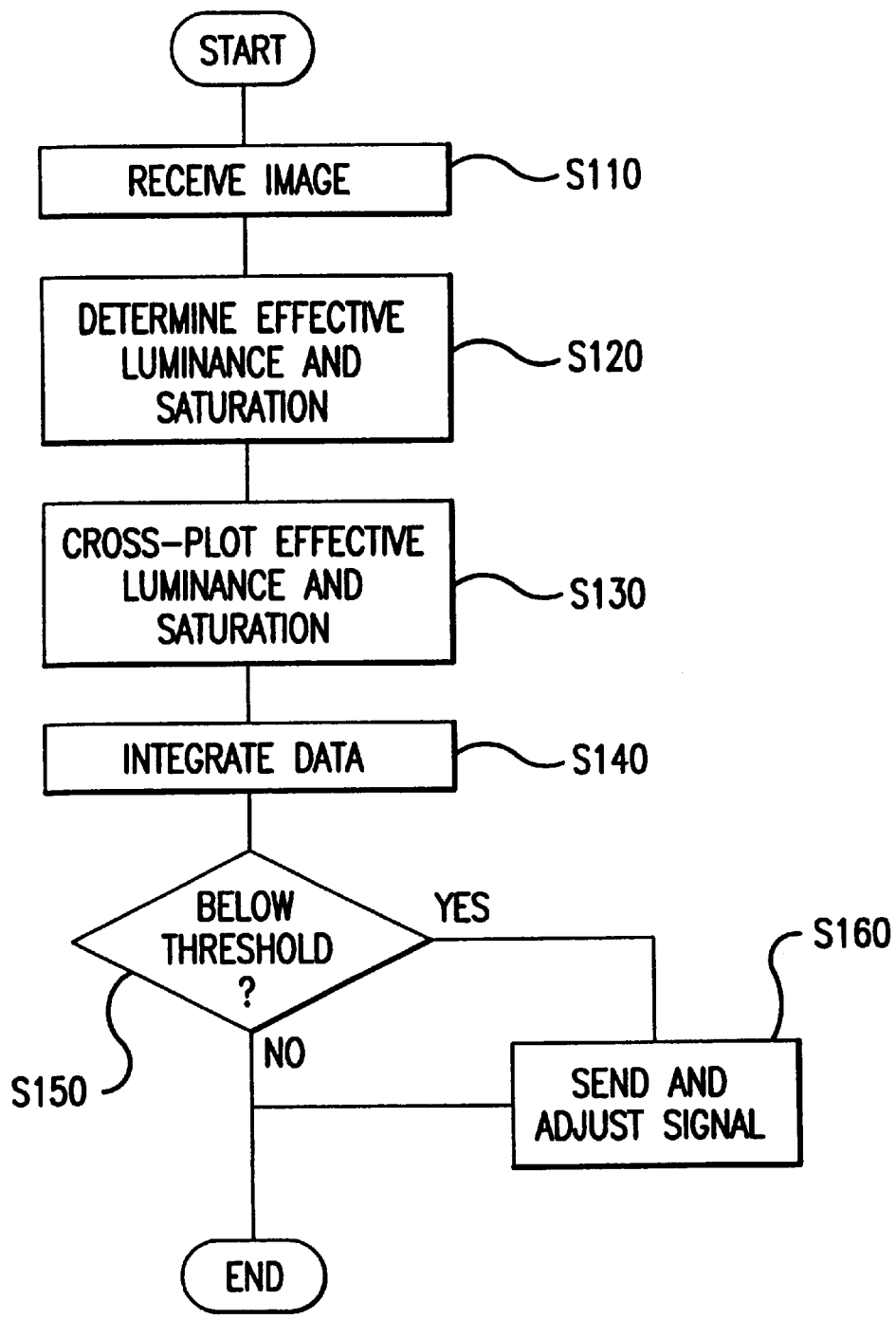
FIG. 9 is a full diagram illustrating the operation of the automatic $\gamma$ processor of FIG. 8.

FIG. 9 is a flow diagram illustrating the operation of the processor 200. In step S100, the processor 200 receives an electronic document, the process then moves to step S110. In step S120, the transform module 250 computes the effective luminance and effective saturation of the electronic image. The process then moves to step S130. In step S130, the transform module 250 constructs a cross-plot of the effective luminance and the effective saturation. The process then moves to step S140. In step S140, the histogram module 220 integrates the cross-plot to develop a cumulative histogram of the effective luminance. The process then moves to step S1 50. In step S150, the determination module 260 determines if at least two of bands 4, 5 and 6 are below the threshold 45° line. If at least two of the bands 4, 5 and 6 are below the threshold 45° line, the process moves to step S160. Otherwise the process moves to step S170. In step S160, the controller 230 develops an instruction to send to a printer to adjust a γ of the printer. The process then moves to step S170. At step S170, the process ends.

As shown in FIGS. 7 and 8, the processor 200 may be implemented on a programmable general purpose computer. However, the processor 200 may also be implemented on a special purpose computer, a programmable microprocessor or controller and peripheral integrated circuit elements, an ASIC or other integrated circuit, a digital signal processor, a hard wired electronic or logic circuit such as a discrete element circuit, a programmable logic device such as a PLD, PLA, FPGA or PAL, or the like. In general, any device, capable of implementing a finite state machine capable of implementing the flowchart shown in FIG. 9 can be used to implement the processor 200.

It should also be appreciated that the processor 200 may be a standalone device, integrated into a network such as the Internet, or integrated into a personal computer.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An apparatus for controlling an image output device, comprising:
    a transform module that forms a cross-plot of a document's effective luminance and effective saturation;
    a histogram module that generates a histogram based on the cross-plot;
    a determination module that examines the histogram over a predetermined subset of effective luminance values; and
    a controller that controls operation of the image output device based on the examination performed by the determination module.

2. The apparatus of claim 1, wherein the determination module determines a relationship of the predetermined subset with respect to a threshold.

3. The apparatus of claim 2, wherein the controller controls the image output device to print an image when the determination module determines that a predetermined number of bands in the predetermined subset exceed the threshold.

4. The apparatus of claim 2, wherein the controller controls the image output device to adjust a γ of the image output device when the determination module determines that a predetermined number of bands in the predetermined subset are below the threshold.

5. The apparatus of claim 4, wherein the threshold corresponds to a line on the histogram.

6. The apparatus of claim 5, wherein the determination module determines whether at least three of the bands are below the threshold.

7. The apparatus of claim 6, wherein the transform module computes the document's effective saturation according to the relationship:

$$\text{Effective saturation} = \max(r,g,b) - \min(r,g,b) - \frac{1}{2} + |[\frac{1}{2} - \text{mid}(r,g,b)]|$$

wherein, max (r,g,b) is a maximum of each of the red, green, and blue triplets, min (r,g,b) is a minimum of each red, green, and blue triplet, and mid (r,g,b) is the mid-point of each red, green, and blue triplet.

8. The apparatus of claim 7, wherein the transform module computes the document's effective luminance according to the relationship:

$$\text{Effective luminance} = \frac{1}{2} \times [\max(r,g,b) + \min(r,g,b)]$$

wherein, max (r,g,b) is a maximum of each of the red, green, and blue triplets and min (r,g,b) is a minimum of each red, green, and blue triplet.

9. The apparatus of claim 1, wherein the histograms are self-normalized.

10. An apparatus for controlling an image output device, comprising:
    cross-plot forming means for forming a cross-plot of a document's effective luminance and effective saturation;
    generating means for generating a histogram based on the cross-plot;
    determining means for examining the histogram over a predetermined subset of effective luminance values; and
    controlling means for controlling the image output device based on the examination performed by the determining means.

11. The apparatus of claim 10, wherein the determining means determines a relationship of the predetermined subset with respect to a threshold.

12. The apparatus of claim 11, wherein the controlling means controls the image output device to print an image when the determining means determines that a predetermined number of bands in the predetermined subset exceed the threshold.

13. The apparatus of claim 11, wherein the controlling means controls the image output device to adjust a γ of the image output device when the determining means determines that a predetermined number of bands in the predetermined subset are below the threshold.

14. The apparatus of claim 13, wherein the threshold corresponds to a line on the histogram.

15. The apparatus of claim 14, wherein the determining means determines whether at least three of the bands are below the threshold.

16. The apparatus of claim 15, wherein the computing means computes the document's effective saturation according to the relationship:

$$\text{Effective saturation} = \max(r,g,b) - \min(r,g,b) - \tfrac{1}{2} + |[\tfrac{1}{2} - \text{mid}(r,g,b)]|$$

wherein, max (r,g,b) is a maximum of each of the red, green, and blue triplets, min (r,g,b) is a minimum of each red, green, and blue triplet, and mid (r,g,b) is the mid-point of each red, green, and blue triplet.

17. The apparatus of claim 16, wherein the computing means computes the document's effective luminance according to the relationship:

$$\text{Effective luminance} = \tfrac{1}{2} \times [\max(r,g,b) + \min(r,g,b)]$$

wherein, wherein, max (r,g,b) is a maximum of each of the red, green, and blue triplets and min (r,g,b) is a minimum of each red, green, and blue triplet.

18. The apparatus of claim 10, wherein the histograms are self-normalized.

19. A method for automatically detecting an image γ, comprising:

forming a cross-plot of the document's effective luminance and effective saturation;

generating a histogram based on the cross-plot;

examining the histogram over a predetermined subset of effective luminance values; and controlling an image output device based on the examining step.

20. The method of claim 19, further comprising determining a relationship of the predetermined subset with respect to a threshold.

21. The method of claim 20, wherein the controlling step controls the image output device to print an image when the determining step determines that a predetermined number of bands in the predetermined subset exceed the threshold.

22. The method of claim 20, wherein the controlling step controls the image output device to adjust a γ of the image output device when the determining step determines that a predetermined number of bands in the predetermined subset are below the threshold.

23. The method of claim 22, wherein the threshold corresponds to a line on the histogram.

24. The method of claim 23, wherein the determining step determines whether at least three of the bands are below the threshold.

25. The method of claim 24, wherein the computing step computes the effective saturation according to the relationship:

$$\text{Effective saturation} = \max(r,g,b) - \min(r,g,b) - \tfrac{1}{2} + |[\tfrac{1}{2} - \text{mid}(r,g,b)]|$$

wherein, max (r,g,b) is a maximum of each of the red, green, and blue triplets, min (r,g,b) is a minimum of each red, green, and blue triplet, and mid (r,g,b) is the mid-point of each red, green, and blue triplet.

26. The method of claim 25, wherein the computing step computes the effective luminance according to the relationship:

$$\text{Effective luminance} = \tfrac{1}{2} \times [\max(r,g,b) + \min(r,g,b)]$$

wherein, max (r,g,b) is a maximum of each of the red, green, and blue triplets and min (r,g,b) is a minimum of each red, green, and blue triplet.

27. The method of claim 19, wherein the histograms are self-normalized.

* * * * *